Jan. 25, 1949.  N. VACHER  2,460,204
CYCLE BRAKE
Filed Dec. 26, 1945  2 Sheets-Sheet 1
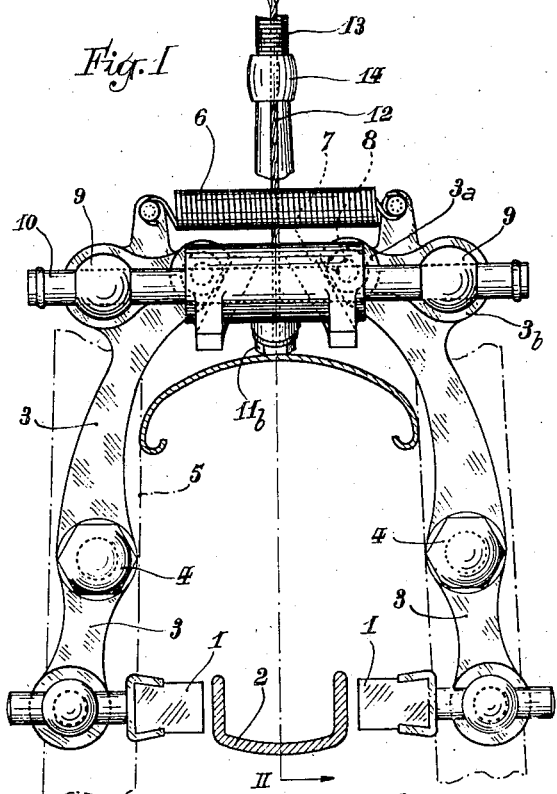
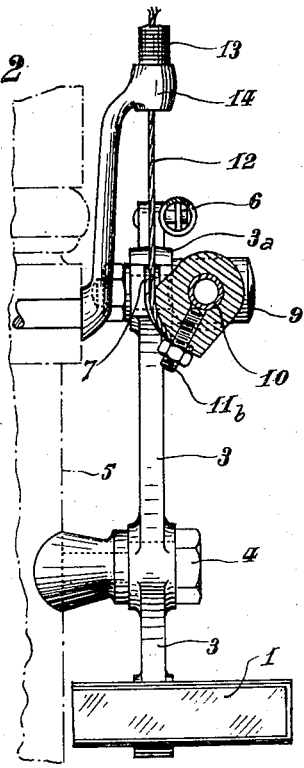
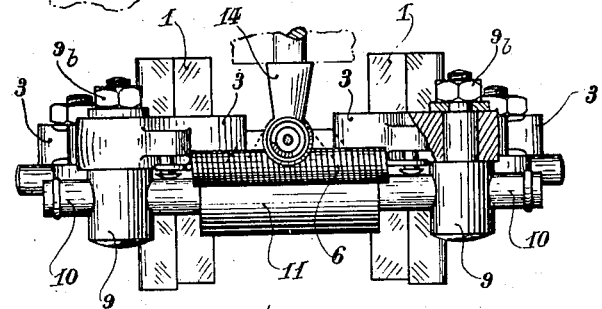
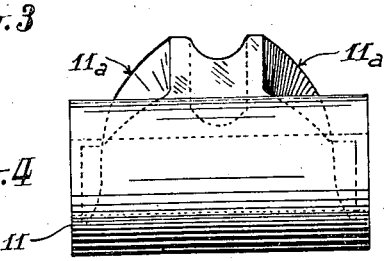
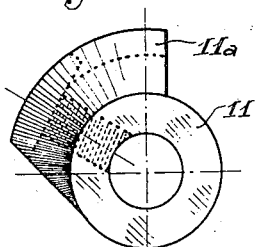
INVENTOR:
Nicolas Vacher
ATTORNEYS Jan. 25, 1949.　　　　　　N. VACHER　　　　　　2,460,204
CYCLE BRAKE
Filed Dec. 26, 1945　　　　　　　　　　　　2 Sheets-Sheet 2
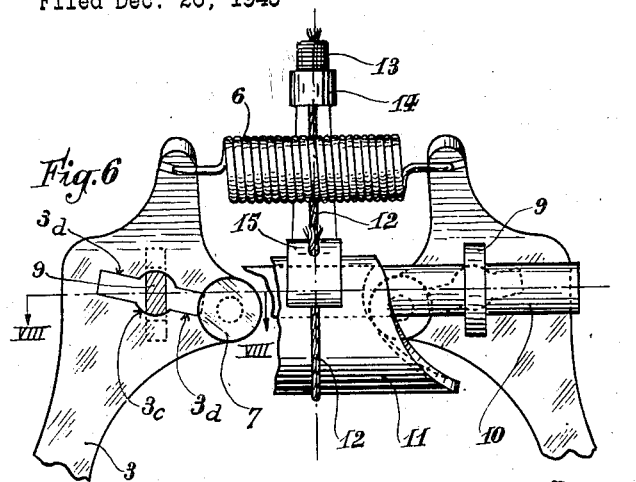
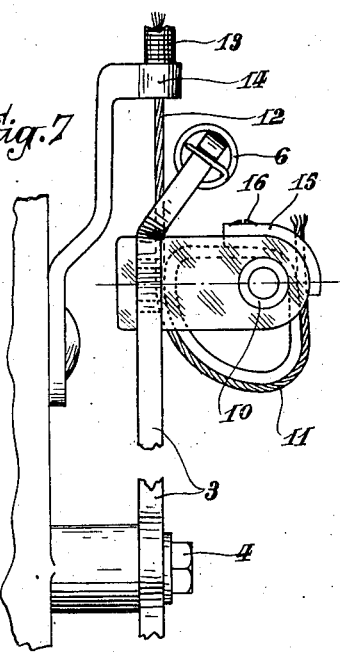
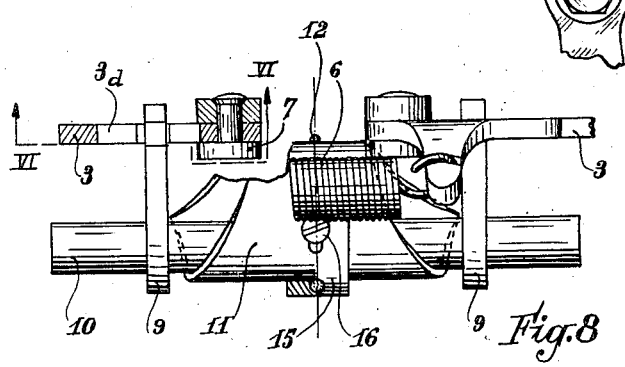
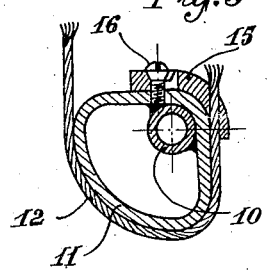
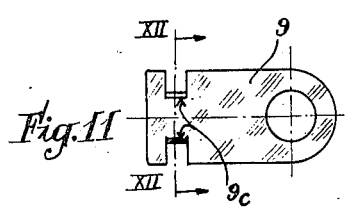
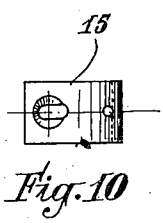
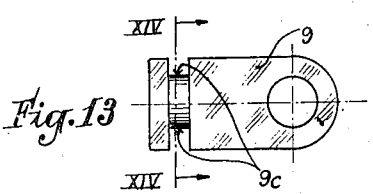
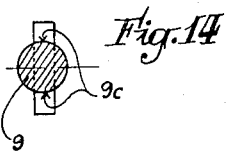
INVENTOR:
Nicolas Vacher
By Alexander Dowell
ATTORNEYS Patented Jan. 25, 1949

2,460,204

UNITED STATES PATENT OFFICE 2,460,204

CYCLE BRAKE

Nicolas Vacher, Saint-Etienne, France

Application December 26, 1945, Serial No. 637,164
In France October 10, 1940

Section 1, Public Law 690, August 8, 1946
Patent expires October 10, 1960

7 Claims. (Cl. 188—24)

My invention refers to cycle brakes of the kind in which the brake shoes are carried by the lower ends of arms separately pivoted on the fork and are applied against the wheel rim by means acting on the upper ends of the said arms.

A first object of my invention is to provide a brake of the aforesaid type, wherein a moderate tractive pull from the controlling cable will produce a powerful braking pressure.

Another object of my invention is to provide a brake of the said type, wherein the arms carrying the brake shoes are acted upon in opposed directions by helicoidal surfaces provided on a common rotating driving member.

Still a further object of my invention is a brake of the character described wherein the common rotating driving member is carried by the brake arms themselves while being axially free with respect to the same.

In the annexed drawings:

Fig. 1 is a front view of a first embodiment of my improved brake.

Fig. 2 is a side view thereof.

Fig. 3 is a plan view thereof.

Fig. 4 is an enlarged front view of the brake actuating member.

Fig. 5 is an end view thereof.

Fig. 6 is a fragmental front view with parts in section illustrating another embodiment of my invention.

Fig. 7 is the corresponding side view.

Fig. 8 is the corresponding plan view with parts in section.

Fig. 9 is a cross sectional view of the brake actuating member.

Fig. 10 is a plan view of the cable locking plate for this actuating member.

Fig. 11 is a side view of one of the spindle guiding heads.

Fig. 12 is an end view thereof.

Figs. 13 and 14 are side and end views of a modified guiding head.

The brake illustrated in Figs. 1 to 3 comprises two brake shoes 1 laterally disposed with respect to the wheel rim 2. Shoes 1 are carried by the lower ends of levers 3 rotatably mounted on pivots 4 fixed on the fork branches indicated in 5. Levers 3 extend above pivots 4 and they are connected with each other by a common spring 6 which tends to bring their upper ends towards each other, whereby the brake shoes 1 are moved apart outwardly and clear the wheel rim 2.

The upper end of each lever 3 is provided with a first or inner lug 3a which houses a roller 7 freely mounted on a pin 8, and with a second or outer lug 3b carrying a rotatable head 9. As illustrated in Fig. 3, head 9 has a tail portion 9a which is free within lug 3b and terminates beyond the same by a threaded end receiving a nut 9b which bears against a shouldered part of tail 9a.

Heads 9 are provided with a transverse hole and they accommodate a common transverse hollow spindle 10 carrying a driving member 11 (Figs. 4 and 5) in the form of a cylinder having a radial projecting part forming two opposed helicoidal surfaces 11a adapted to cooperate with rollers 7.

The brake also comprises a driving cable 12, the end of which is attached at 11b to member 11. Cable 12 cooperates with a cable sheath 13 of the conventional type, which abuts against a fixed abutment 14 secured to the fork head.

When the brake is not actuated, the upper ends of levers 3 are urged towards each other by spring 6 and rollers 7 bear against surfaces 11a and therefore tend to rotate member 11 in anti-clockwise direction in Fig. 2. Cable 12 is thus wound around member 11 for a given angle. Shoes 1 are spaced from rim 2.

When cable 12 is pulled, member 11 is rotated in clockwise direction (Fig. 2) and through surfaces 11a it causes the upper ends of levers 3 to move apart against the action of spring 6, whereby shoes 1 are applied against rim 2. The ratio between the braking pressure and the pull of cable 12 depends upon the angle or pitch of surfaces 11a, which may be selected as reduced as desired.

It will be observed that the actuating pressure is directly transmitted to rollers 7, while heads 9 only act as guides for spindle 10.

In the modified construction of Figs. 6 to 8 heads 9 are in the form of substantially flat members. The upper end of each lever 3 is provided with an opening comprising a central circular part 3c and two opposed rectangular parts 3d. The corresponding head 9 (Figs. 11 and 12) has two opposed notches 9c leaving between them a plain portion which fits within the circular part 3c. It will be understood that head 9 can be introduced into the opposed rectangular parts of the opening of lever 3 until notches 9c are in the plane of the said lever; head 9 is then rotated through about 90° whereby it is axially retained while being free to rotate through a small angle under the action of spindle 10 during actuation of the brake.

The plain portion left on heads 9 between notches 9c may be cylindrical, as indicated in Figs. 13 and 14.

Member 11 is hollow and in the form of a sector with inclined lateral edges co-acting with rollers 7. It may be formed for instance of a piece of sheet-iron welded to spindle 10. Cable 12 is wound around the arcuate periphery of member 11 and its end is passed through a hole provided in the curved part of a small plate 15 which fits on member 11 in the portion thereof directly surrounding spindle 10, as indicated in Fig. 9. Plate 15 is fixed to member 11 by means of a screw 16 with a conical head bearing against one end of an elongated opening 15a provided in plate 15. It will be understood that when screw 16 is tightened, plate 15 is moved towards the left of Fig. 9 under the action of screw 16, whereby the end of cable 12 is clamped in position.

I claim:

1. A cycle brake comprising two brake shoes adapted to laterally cooperate with the rim of the wheel to be braked; two brake levers respectively pivoted about parallel pivots fixed to the branches of a fork carrying said wheel, said levers carrying said shoes at one end while their other end extends beyond said pivots; a head pivoted on each of said last-named ends about an axis parallel to the axes of said pivots; a spindle slidably and rotatably engaged through said heads transversely to the same; a drum carried by said spindle between said heads, said drum having a substantially triangular projection on its periphery substantially symmetrical with respect to a plane transverse to said drum; means on said last-named ends to co-act with the sides of said triangular projection; means to rotate said drum to move said last-named ends apart; and spring means to restore said brake levers to the inactive position.

2. In a cycle brake as claimed in claim 1, said ends of said levers opposed to said brake shoes carrying rotatable rollers to co-act with the sides of said triangular projection.

3. A cycle brake comprising two brake shoes adapted to laterally cooperate with the rim of the wheel to be braked; two brake levers respectively pivoted to the branches of a fork carrying said wheel, said levers carrying said shoes at one end while their other end extends beyond said pivots, and said last-named end being provided with an opening comprising a central circular portion with two opposed rectangular portions extending therefrom; a head pivoted within said central circular portion of said opening on each of said brake levers, said head extending beyond said opening in the form of a projection transversely larger than said central circular portion but able to be passed through said opposed rectangular portions; a common spindle slidably engaged through said heads; a member rotatable on said spindle, said member having helicoidal surfaces adapted to coact with said last-named ends to move the same apart; and means to rotate said member in the direction corresponding to the moving apart of said last-named ends.

4. A cycle brake comprising two brake shoes adapted to laterally cooperate with the rim of the wheel to be braked; two brake levers respectively pivoted about substantially parallel axes, to the branches of a fork carrying said wheel, each of said levers carrying one of said brake shoes at one end while its other end extends beyond its pivot; a head pivoted on the end of each of said levers opposed to the brake shoe carried by this lever, about an axis parallel to the axes of the pivots of said levers on said fork branches; a common spindle slidably engaged through said heads; a rotatable member carried by said spindle, said member having helicoidal surfaces adapted to co-act with the ends of said levers opposed to said brake shoes to move same apart; and means to rotate said member in the direction corresponding to the moving apart of said last-named ends.

5. A cycle brake comprising two brake shoes adapted to laterally cooperate with the rim of the wheel to be braked; two brake levers respectively pivoted about substantially parallel axes, to the branches of a fork carrying said wheel, each of said levers carrying one of said brake shoes at one end while its other end extends beyond its pivot; a common spindle slidably carried by the ends of said levers opposed to said brake shoes, said spindle being also able to rotate with respect to said last-named ends about an axis substantially parallel to the axes of the pivots of said levers on said fork branches; a rotatable drum carried by said spindle co-axially to the same, said drum having a substantially triangular projection, the opposed helicoidal edges of which are adapted to co-act with said last-named ends to move same apart; and means to rotate said member in the direction corresponding to the moving apart of said last-named ends.

6. A cycle brake comprising two brake shoes adapted to laterally cooperate with the rim of the wheel to be braked; two brake levers respectively pivoted about substantially parallel axes, to the branches of a fork carrying said wheel, each of said levers carrying one of said brake shoes at one end while its other end extends beyond its pivot; a head pivoted on the end of each of said levers opposed to the brake shoe carried by this lever, about an axis parallel to the axes of the pivots of said levers on said fork branches; a common spindle slidably engaged through said heads; a rotatable member carried by said spindle, said member having helicoidal surfaces adapted to co-act with the ends of said levers opposed to said brake shoes to move same apart; and a cable wound around said member to rotate same in the direction corresponding to the moving apart of said last-named ends.

7. A cycle brake comprising two brake shoes adapted to laterally cooperate with the rim of the wheel to be braked; two brake levers respectively pivoted about substantially parallel axes, to the branches of a fork carrying said wheel, each of said levers carrying one of said brake shoes at one end while its other end extends beyond its pivot; a common spindle slidably carried by the ends of said levers opposed to said brake shoes, said spindle being also able to rotate with respect to said last-named ends about an axis substantially parallel to the axes of the pivots of said levers on said fork branches; a member in the form of a sector of a drum, carried by said spindle, said member having oblique end faces adapted to co-act with said last-named ends to move same apart; and a cable fixed to said member and wound around same to rotate said member in the direction corresponding to the moving apart of said last-named ends.

NICOLAS VACHER.

REFERENCES CITED

The following references are of record in the file of this patent:

FOREIGN PATENTS

| Number | Country | Date |
|---|---|---|
| 326,361 | France | Feb. 19, 1903 |